Dec. 24, 1963     E. S. RUPE     3,115,054
PIPE BEVELING DEVICE
Filed Feb. 27, 1962     2 Sheets-Sheet 1

INVENTOR.
ERNEST S. RUPE
BY
Kimmel & Crowell
ATTORNEYS.

Dec. 24, 1963    E. S. RUPE    3,115,054
PIPE BEVELING DEVICE
Filed Feb. 27, 1962    2 Sheets-Sheet 2
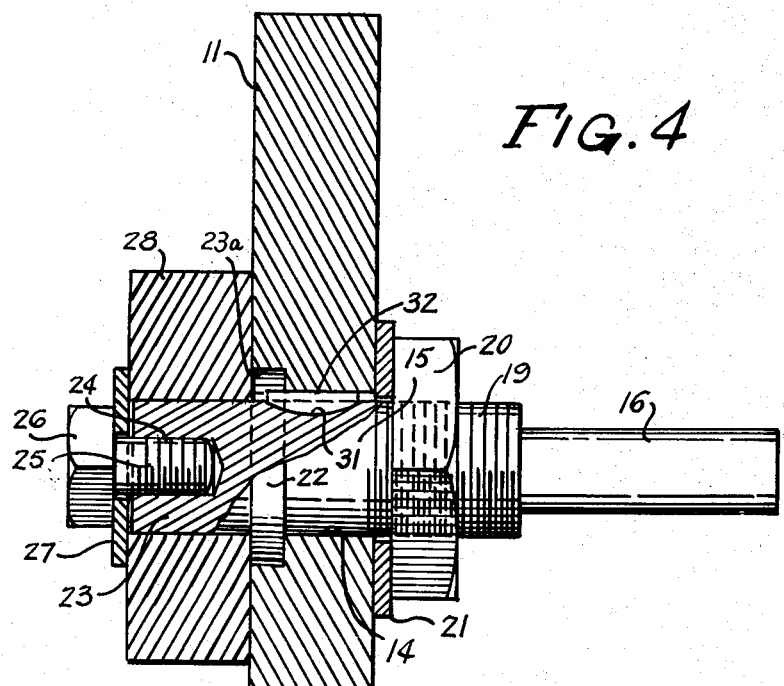
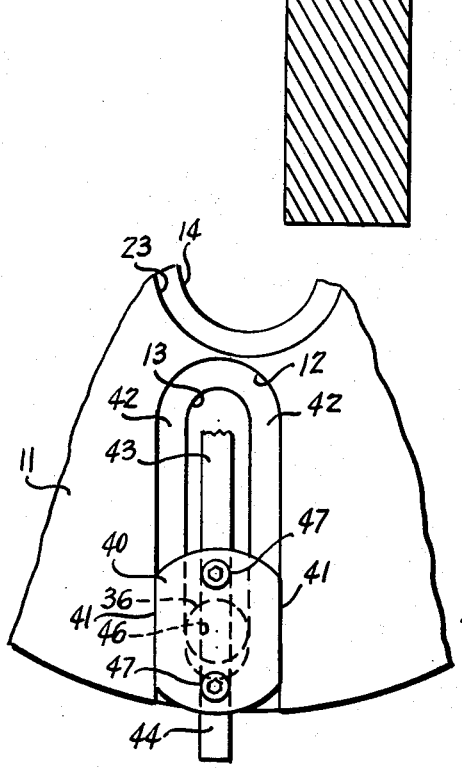
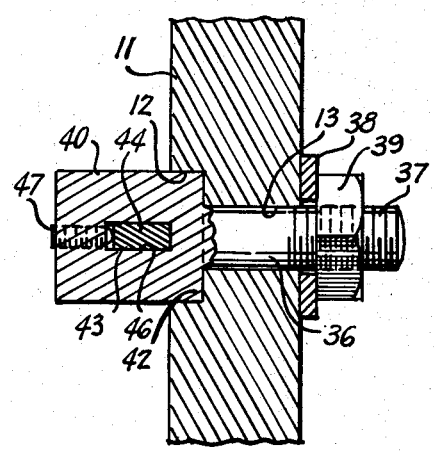
INVENTOR.
ERNEST S. RUPE
BY
Kimmel & Crowell
ATTORNEYS.

ive of the instant invention shown as applied to the end of a pipe, and held in the chuck of an electric drill or the like, the latter being indicated in dotted lines. The figure also shows a plurality of sizes of bushings which may be employed with pipes of different diameter.

United States Patent Office 3,115,054
Patented Dec. 24, 1963

3,115,054
PIPE BEVELING DEVICE
Ernest S. Rupe, 9555 Folsom Blvd., Sacramento, Calif.
Filed Feb. 27, 1962, Ser. No. 176,035
2 Claims. (Cl. 82—1)

This invention relates to a pipe beveling device, and has particular applicability to a device which may be employed with any conventional electric drill or the like, which will accurately bevel the ends of all types of pipes in several sizes so that when they are joined together an accurate V is formed to facilitate welding into one unit.

An additional object of the invention is the provision of a device of this character which will form an absolutely accurate bevel, avoiding the chattering and the resultant irregularity which results from the use of ordinary tools or grinders.

A further and more specific object of the invention is the provision of a device of this character which is particularly useful in beveling stainless steel pipe, which is exceptionally tough, or other pipes of kindred nature.

Still other objects will in part be obvious and in part be pointed out as the description of the invention proceeds, and shown in the accompanying drawing wherein there is disclosed the preferred form of the instant invention.

In the drawings:

FIGURE 4 is an enlarged sectional view taken substantially along the line 4—4 of FIGURE 1 as viewed in the direction indicated by the arrows, parts thereof being broken away.

FIGURE 5 is an enlarged sectional view taken substantially along the line 5—5 of FIGURE 1 as viewed in the direction indicated by the arrows, parts thereof being shown in full lines; and FIGURE 6 is a fragmentary sectional view taken substantially along the line 6—6 of FIGURE 1 as viewed in the direction indicated by the arrows.

Similar reference characters refer to similar parts throughout the several views of the drawing.

Figure 2:
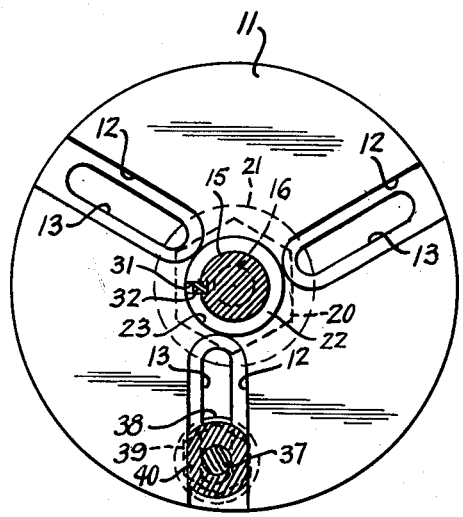
FIGURE 2 is a sectional view taken substantially along the line 2—2 of FIG. 1 as viewed in the direction indicated by the arrows.
Figure 3:
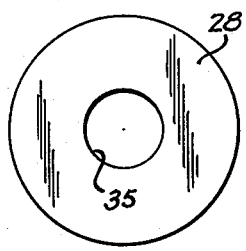
FIGURE 3 is a plan view taken substantially along the line 3—3 of FIGURE 1 as viewed in the direction indicated by the arrows.

Having reference now to the drawing in detail, the device of the instant invention is generally indicated at 10, and comprises a substantially circular base plate 11 which is provided, as best seen in FIG. 2, with a plurality of bit holder guides 12, each of which includes a slot 13, the slot being positioned in offset relation to the radii of the circular base plate, as is conventional practice.

A central opening 14 is provided in plate 11 and accommodates a relatively smooth portion 15 of a shaft 16, the latter being adapted to be inserted in the drill chuck 17 of a conventional electric drill 18 or the like for rotation. Interposed between portions 15 and 16 is a threaded section 19, upon which is threaded a machine nut 20 over a washer 21.

A flange 22 on said shaft seats in a recess 23a in the face of base plate 10 which is adapted to engage in the pipe to be beveled, and an extending portion 23 of the shaft extends outwardly therebeyond. Portion 23 includes a threaded bore 24 which is engaged by a bolt 25 having a head 26, a washer 27 being interposed between the head 26 and the face of a selected bushing 28, the bushing being designed to fit interiorly of a pipe section 29, the end of which is to be beveled as at 30. As best seen in FIGURE 4, portion 15 is provided with a keyway 31 in which is positioned a key 32 fitting in a corresponding keyway in the bore 14 so that the base plate 11 is revolved with the shaft 16.

Referring back to bushing 28, it will be seen that a relatively large bushing is shown in position to engage the pipe 29, the bushing being provided with a central opening 35 to enable the same to be fitted over the extending portion 23. Bushings 28 are provided in a plurality of sizes, as indicated at 28a, 28b, 28c, and 28d for the accommodation of different sizes of pipe, all the bushings being of substantially identical thickness, and all of them having the same size central opening so as to be readily interchangeable.

Figure 1:
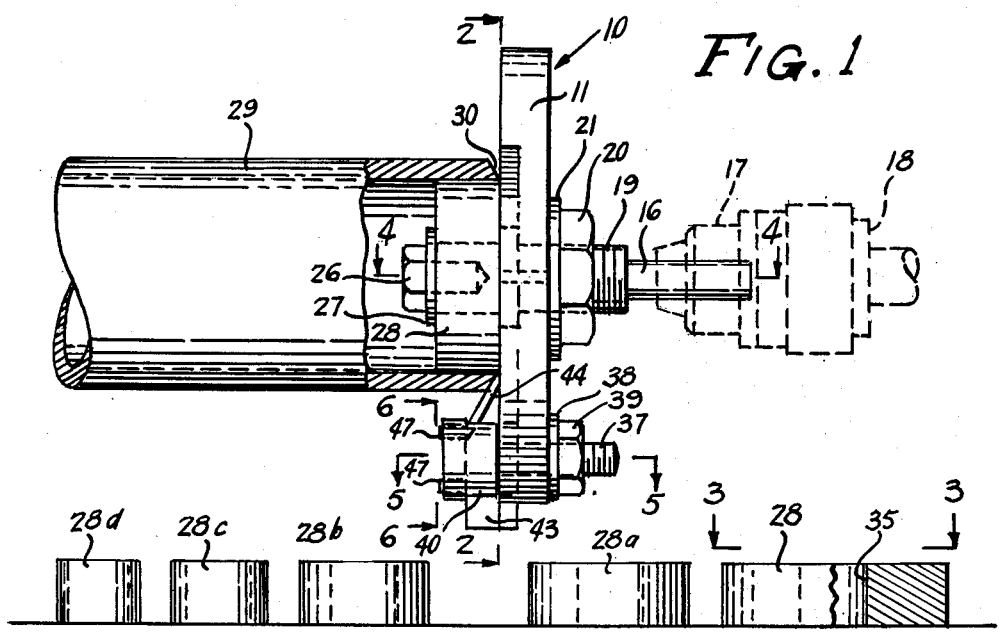
FIGURE 1 is a fragmentary side elevational view of the beveling device of the instant invention shown as applied to the end of a pipe, and held in the chuck of an electric drill or the like, the latter being indicated in dotted lines. The figure also shows a plurality of sizes of bushings which may be employed with pipes of different diameter.

Positioned in a selected one or more of the slots 13 is a bit holder 40, which is provided with flattened side portions 41 which engage the side guide channels 42 on opposite sides of slot 13 for the purpose of holding a cutting bit 43 in direct alignment with the surface to be beveled. As best seen in FIGURE 1, cutting bit 43 is provided with a bevel cutting blade 44, which serves to form the bevel 30 on the pipe 29. Cutter bit 43 extends through a slot 46 in holder 40, and is secured in position by set screws 47, firmly to secure the bit against longitudinal slippage.

From the foregoing the use and operation of the device should now be readily apparent. A bushing 28 of proper size to accommodate the pipe to be beveled is fitted over the portion 23 and clampingly engaged by the bolt 25 to secure the same in position with the base plate 11. By loosening set screws 47 and nut 39, the blade may be adjusted as desired, as may the bit holder 40 to align the end of blade 44 of bit 43 with the edge to be beveled. The shaft 16 is then positioned in the chuck 17 of an electric drill 18, which upon energization will cause rotation of the plate 11, and consequent rotation of the blade 44, thus insuring an accurate and even bevel around the edge of the pipe.

It will thus be seen that there is herein provided a pipe beveling apparatus which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A pipe beveling device comprised of a face plate having a central opening, a shaft extended through said opening and keyed therein, said shaft having a reduced extending portion at one end adapted to be engaged in a drill chuck, a threaded portion adjacent said reduced portion, and an oppositely extending portion at its other end having a threaded bore therein, a clamping nut on said threaded portion, said plate having a recess therein, a flange on said oppositely extending portion seating in said recess in flush relation with said plate, a bushing having a central opening therein engageable over said oppositely extending portion and seating in flush relation against said flange and said plate, and adapted to engage the interior of a pipe to be beveled, a screw having a head engaging said threaded bore for securing said bushing in position, a washer seated between said head and said bushing, at least one offset radial slot in said base plate, a bit holder movable in said slot, and a cutting bit carried by said bit holder, said slot having aligned side portions serving as guides and said bit holder having flattened sides movable along said aligned side portions, a threaded stem extending through said slot, a clamping nut engaging the end of said stem, said bit holder having a substantially rectangular opening therein through which said cutting bit extends, and set screw means securing said cutting bit in a selected position of linear adjustment in said rectangular opening, said bit having a beveled cutting edge movable to a position with its point adjacent the rim of said bushing accurately to bevel the pipe mounted on said bushing.

2. The structure of claim 1 wherein a plurality of different sizes of bushings are provided for interchangeable mounting on said oppositely extending portion to accommodate a variety of sizes of pipes.

References Cited in the file of this patent

UNITED STATES PATENTS

| | | |
|---|---|---|
| 918,003 | Campbell | Apr. 13, 1909 |
| 2,607,376 | Montgomery | Aug. 19, 1952 |
| 2,868,085 | Klein | Jan. 13, 1959 |

FOREIGN PATENTS

| | | |
|---|---|---|
| 993,747 | France | July 25, 1951 |